United States Patent
Bonorden

(10) Patent No.: US 11,609,745 B2
(45) Date of Patent: Mar. 21, 2023

(54) ASYNCHRONOUS DATA OBJECTS FOR AN EVENT DRIVEN PROGRAMMING LANGUAGE

(71) Applicant: McAfee, LLC, Santa Clara, CA (US)

(72) Inventor: Olaf Bonorden, Paderborn (DE)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/861,916

(22) Filed: Jan. 4, 2018

(65) Prior Publication Data
US 2018/0285083 A1 Oct. 4, 2018

Related U.S. Application Data

(60) Provisional application No. 62/480,053, filed on Mar. 31, 2017.

(51) Int. Cl.
*G06F 8/30* (2018.01)
*G06F 9/48* (2006.01)

(52) U.S. Cl.
CPC ............... *G06F 8/31* (2013.01); *G06F 9/485* (2013.01)

(58) Field of Classification Search
CPC ......... G06F 17/30445; G06F 17/30581; G06F 17/30902; G06F 17/30286; G06F 9/5016; G06F 9/544; G06F 9/485; G06F 9/4812; G06F 9/3009; G06F 9/46; G06F 9/52; G06F 9/461; G06F 9/3851; G06F 8/31; G06F 11/1438
See application file for complete search history.

(56) References Cited

U.S. PATENT DOCUMENTS

| | | | |
|---|---|---|---|
| 6,088,803 A * | 7/2000 | Tso ............... | H04L 63/145 709/219 |
| 8,694,961 B2 * | 4/2014 | Batres ............ | G06F 9/4843 717/115 |

(Continued)

OTHER PUBLICATIONS

Leon Alkalaj; Performance of Multi-Threaded Execution in a Shared-Memory Multiprocessor; IEEE; pp. 330-333; retrieved on Oct. 31, 2022 (Year: 1991).*

(Continued)

*Primary Examiner* — S. Sough
*Assistant Examiner* — Cuong V Luu
(74) *Attorney, Agent, or Firm* — Hanley, Flight & Zimmerman, LLC

(57) ABSTRACT

A method for increasing scalability of asynchronous data processing includes interpreting a computer program for reading data from an input data stream, wherein the input data stream is defined in the program as an object having a function for obtaining more data from the input data stream; determining that additional data from the input data stream is required to continue execution of the function in a thread of the interpreted computer program; suspending execution of the thread responsive to a determination that the additional data is unavailable; saving a state information for the suspended thread, wherein the saved state information includes information to allow resumption of the suspended thread; generating an event indication upon availability of at least some of the additional data; and resuming execution of the suspended thread of execution and providing the additional data as a result of the function.

15 Claims, 6 Drawing Sheets

(56) References Cited

U.S. PATENT DOCUMENTS

| | | | | |
|---|---|---|---|---|
| 9,235,396 | B2* | 1/2016 | Ke | G06F 8/453 |
| 9,448,837 | B2* | 9/2016 | Luiz et al. | G06F 9/44 |
| 2006/0179289 | A1 | 8/2006 | Floyd et al. | |
| 2006/0236136 | A1 | 10/2006 | Jones | |
| 2013/0061326 | A1* | 3/2013 | Bennett | G06F 21/51 |
| | | | | 726/24 |
| 2013/0152057 | A1* | 6/2013 | Ke | G06F 8/453 |
| | | | | 717/132 |
| 2013/0263087 | A1* | 10/2013 | Batres | G06F 9/4843 |
| | | | | 717/115 |
| 2016/0078246 | A1 | 3/2016 | Kumar et al. | |
| 2016/0246643 | A1* | 8/2016 | Xu | G06F 9/485 |
| 2018/0285110 | A1* | 10/2018 | Ray et al. | G06F 9/30 |

OTHER PUBLICATIONS

Lance Hammond et al.; Data Speculation Support for a Chip Multiprocessor; ACM; pp. 58-69; retrieved on Oct. 31, 2022 (Year: 1998).*

International Searching Authority, "International Search Report and Written Opinion," issued in connection with International Application No. PCT/US2018/012324, dated Apr. 20, 2018, 15 pages.

International Searching Authority, "International Preliminary Report on Patentability and Written Opinion," issued in connection to International Patent Application No. PCT/US2018/012324, dated Oct. 1, 2019, 9 pages.

* cited by examiner

ASYNCHRONOUS DATA OBJECTS FOR AN EVENT DRIVEN PROGRAMMING LANGUAGE

This patent claims the benefit of U.S. Provisional Patent Application Ser. No. 62/480,053, which was filed on Mar. 31, 2017. U.S. Provisional Patent Application Ser. No. 62/480,053 is hereby incorporated herein by reference in its entirety. Priority to U.S. Provisional Patent Application Ser. Nos. 62/480,053 is hereby claimed.

TECHNICAL FIELD

Embodiments described herein generally relate to computer programming, and more specifically to asynchronous data objects for an event driven programming language.

BACKGROUND ART

In an event driven programming language, parts of the code are executed if certain events occur. For example, an incoming connection might trigger a routine that should handle new connections. During execution, a blocking operation may happen, and the program may try to read data, but find the data is not yet available. One solution is to pause execution of the thread, wait until the operation may continue, and continue execution. In this implementation, a thread's resources may be required and used while waiting. Thus, the solution does not scale if there are many concurrent events at the same time and blocking operations happen frequently.

DESCRIPTION OF EMBODIMENTS

Figure 1:
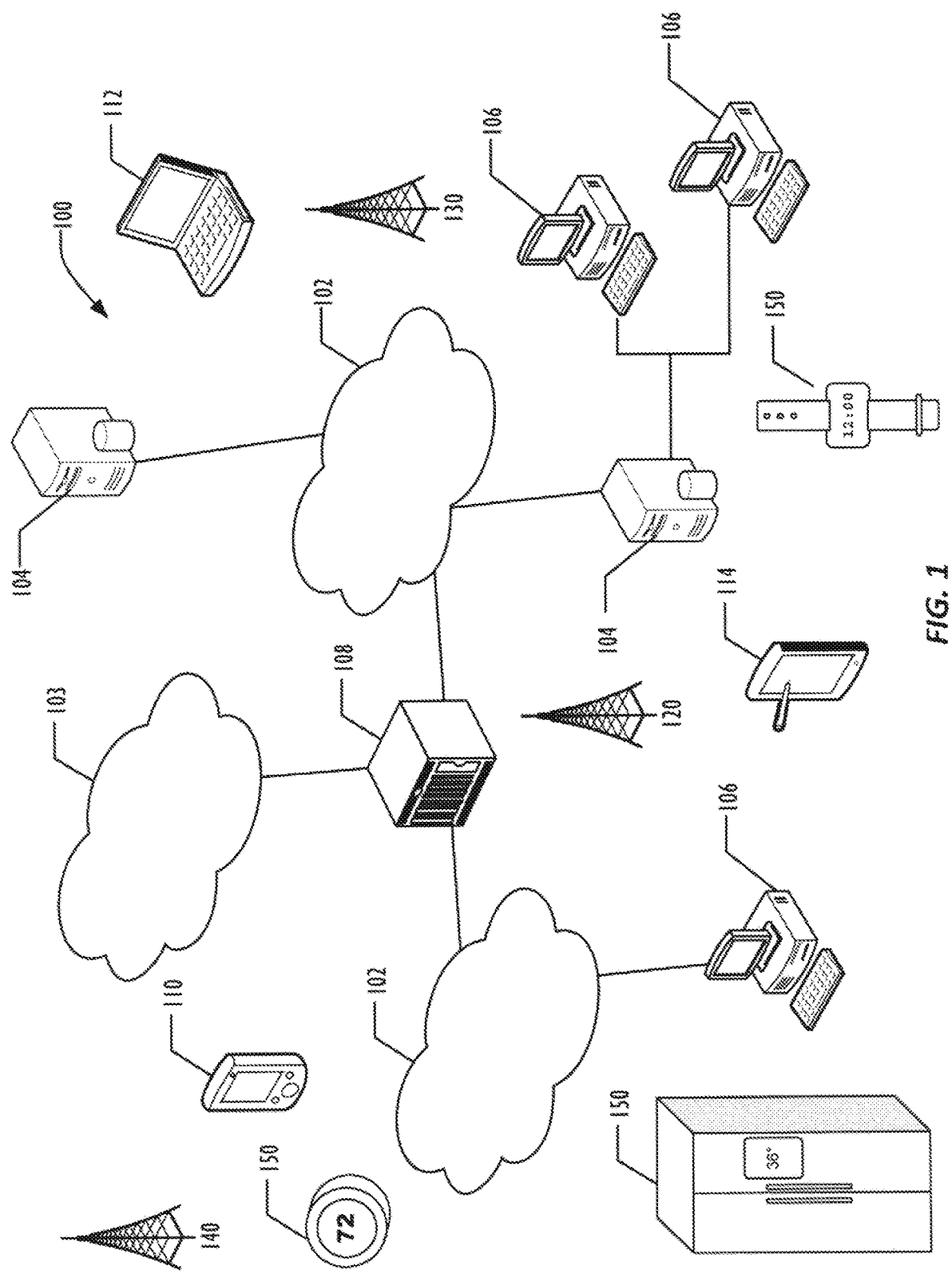
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

One or more embodiments provide a special object for an event driven programming language having a function for obtaining more data from the input data stream. Adding such an object may provide a technique for, in response to determining that processing should be suspended, determining and storing a processing state and ending an execution thread such that the thread's resources may be redirected to other transactions. Instances of the object may describe data blocks that might not be fully available yet, including interface functions that asynchronously fetch more data if needed.

Using this object, a user may be able to build a chain of data structures that might not be available yet. For example, processing HTTP connections as HTTP server or proxy, a user may have an HTTP request object using the TCP stream as such an object, and the request object may provide other objects for the body of the request. Later, if the body should be accessed and not enough data is processed, the object may attempt to obtain additional data using a function call. The call may lead to additional calls for the TCP connection object.

Whenever processing must stop because not enough data is received, the processing chain (such as body, request, and TCP stream), is abandoned and recreated later, without using the thread's resources like a thread does while waiting. According to one or more embodiments, compared to blocking solutions using threads, the use of the new object uses only a small constant number of threads and scales better for a large number of connections. The recreation of the execution stack is done internally by the object. The programming model of the language may look like the traditional way of having threads while blocking IO.

Referring to FIG. 1, an example infrastructure 100 in which embodiments may be implemented is illustrated schematically. Infrastructure 100 contains computer networks 102. Computer networks 102 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things devices (microcontrollers, embedded systems, industrial control computing modules, thermostat, refrigerator, etc.) 150. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, it is most commonly implemented in a firewall or intrusion protection system in a gateway or router.

Figure 2:
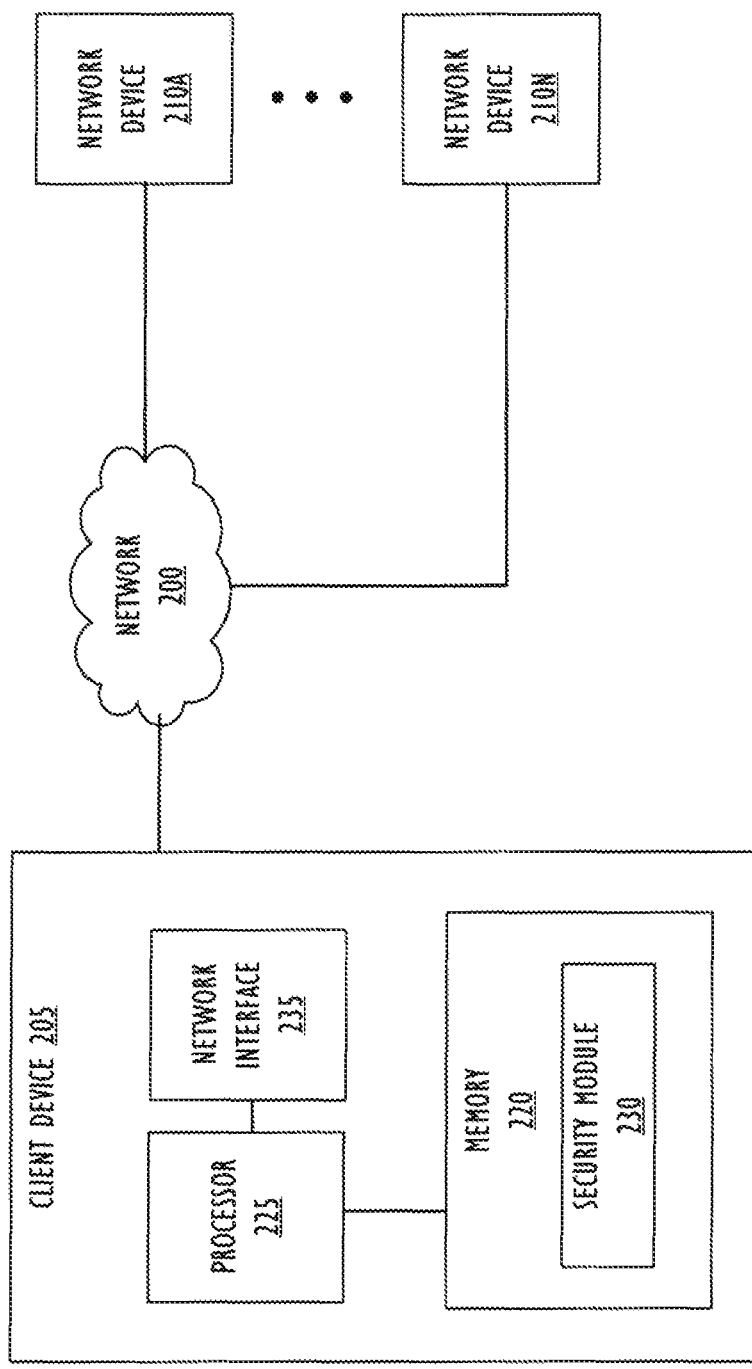
FIG. 2 is a diagram illustrating an example system for utilizing an event driven programming language, according to one or more embodiments.

FIG. 2 is a diagram illustrating an example system for asynchronous processing of a data stream, according to one or more embodiments. FIG. 2 includes a client device 205, and network devices 210A through 210N. Each of client device 205, and network devices 210A through 210N may be connected across network 200. Client device 205 may include, for example, a memory 220 and processor 225, along with a network interface 235 utilized to connect to network devices 210A through 210N over a network 200. Memory 220 may include a number of software or firmware modules executable by processor 225 including in some embodiments an interpreter and library routines for interpreting programming language having the constructs described herein. In one or more embodiments, memory 220 may include a security module 230. Security module 230 may be utilized to perform security functions for data across the network.

Additionally, security module 230 may manage the processing of computer code by processor 225. In one or more embodiments, security module 230 may utilize an event driven programming language utilizing asynchronous data objects to manage performance of processor 225. For example, security module 230 may implement a new object that includes a function for obtaining more data from the input data stream and allows for capturing processing state information if a processing thread requires additional data for processing. For example, the state information may be captured if the thread is waiting on data from network devices 210. According to one or more embodiments, the state information may be captured by a new kind of object in the programming language utilized by security module 230. In one or more embodiments, once the state information is captured by the object, thread resources may be redirected to other transactions. When the additional data is available, the execution stack may be rebuilt based on the object's saved state information. The object may then use its function for obtaining more data from the input data stream to obtain the additional data, allowing execution of the thread to resume. Unlike suspending execution of a thread by waiting for an event, the abandoned thread's resources are freed except for the object's saved state information, freeing processor and memory resources that would otherwise be absorbed by a waiting thread.

Figure 3:
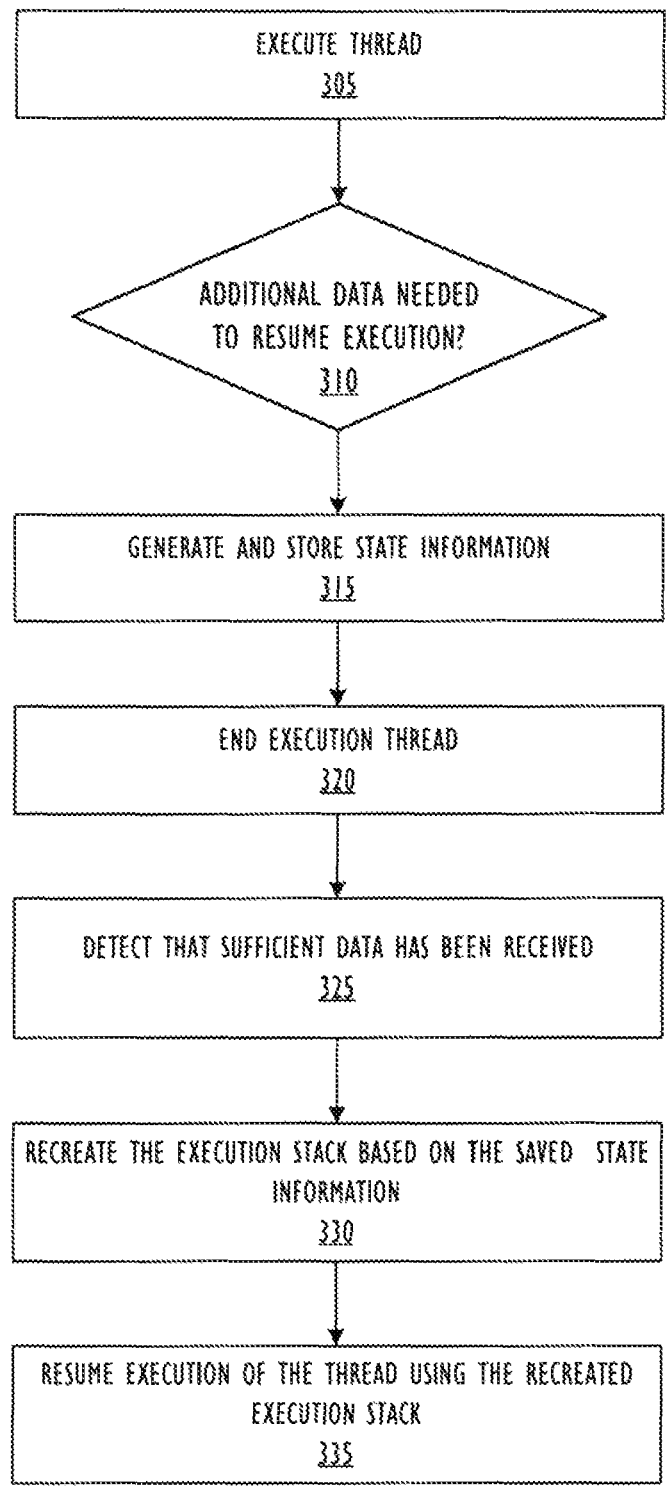
FIG. 3 is a flowchart illustrating a method for utilizing asynchronous data objects for an event driven programming language, according to one or more embodiments.

FIG. 3 is a flowchart illustrating a method of improving scalability of asynchronous data processing. The method begins at 305 and a computer program for reading data from an input stream is interpreted. Note that, although the computer program is here described in terms of an interpreted programming language, the programming language could instead be compiled and executed outside of an interpreter environment. The computer program may identify the input data stream as a programming language object having a function for obtaining more data from the input data stream. At 310, a decision is made regarding whether additional data is needed to continue execution of the computer program. According to one or more embodiments, the events of the event driven programming language may indicate additional data may be required. As an example, execution of the thread cannot continue until additional data from one of the remote network devices is obtained. If, at 310, a determination is made that additional data is required but unavailable from the source for the input data stream, then the flowchart continues at 315 and the interpreter suspends execution of the execution thread. Then, at 320, the interpreter saves state information for the interpreted computer program in the object. The saved state information includes sufficient information to allow the interpreter to resume the suspended thread of execution. Once the thread of execution of the interpreted computer program is suspended and the state information saved, the interpreter may redirect resources to other threads of execution. In one or more embodiments, the thread may be abandoned or destroyed to conserve processing resources. The flowchart continues at 325, and the interpreter decides whether the additional data needed in step 310 is now available. If, at 325, a determination is made that the additional data is available, the flowchart continues at 330, and an event indication is generated. At 335, the interpreter resumes execution of the suspended thread of execution of the interpreted computer program. Then, at 340, the interpreter provides the additional data by using the object's function for obtaining more data from the input data stream.

Figure 4:
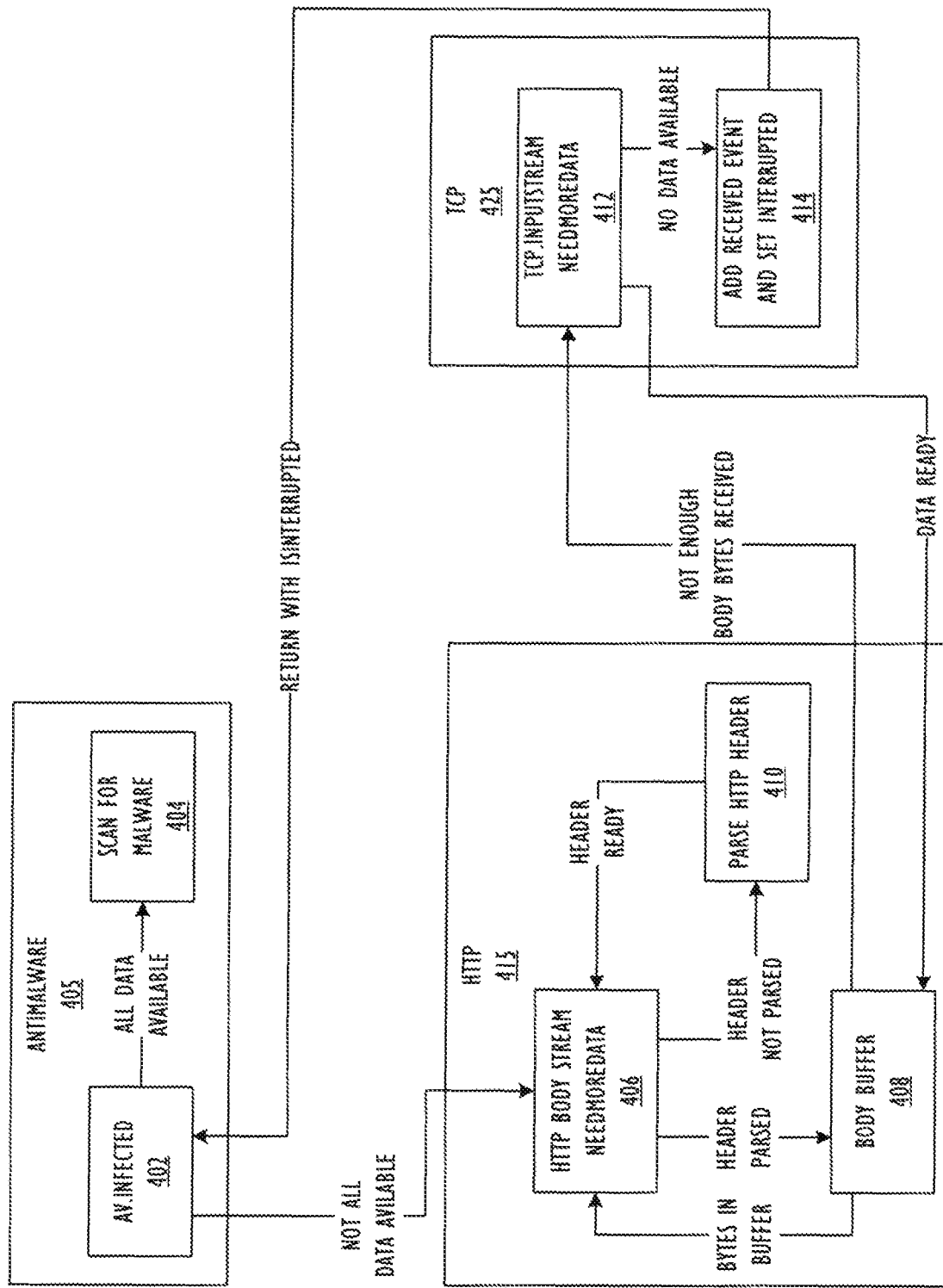
FIG. 4 is a flow diagram illustrating a method for utilizing asynchronous data objects for an event driven programming language, according to one or more embodiments.

FIG. 4 is a flow diagram illustrating a technique for utilizing asynchronous data objects for an event driven programming language, according to one or more embodiments. In this example we look at HTTP processing to show how the concept of need-more-data object could be implemented. A TCP connection is accepted, data is read, the HTTP request is parsed, and the request body is scanned for malware. The example consists of program code containing function calls to module functions. An example of the code corresponding to the flow diagram is as follows:

```
STREAM
ROUTINE Accept ON (accept) {
    TCP.Socket clientSocket = TCP.AcceptedSocket
    stream = clientSocket.InputStream
    STRING protocol = stream.DetectProtocol
    IF protocol == "HTTP" THEN {
        CALL "HTTPConnection"
    }
}
ROUTINE HTTPConnection ON ( ) {
    HTTP.RequestResponse request = HTTP.ParseRequest (stream)
    HTTP.Header requestHeader = request.Header
    NUMBER i = 0
    NUMBER contentLength = 0
    LOOP (requestHeader.Count) {
        IF requestHeader.KeyByIndex (i) == "Content-Length"
        THEN
            contentLength = ToNumber
                (requestHeader.ValueByIndex (i))
        i = i + 1
    }
    IF contentLength > 0 THEN {
```

```
            STREAM body = request.Body
            IF Antivirus.IsInfected (body) THEN {
                    block = "virus found\n"
                    CALL "SendBlock"
                    END(ALL)
            }
    }
    ...
```

In this example program code corresponding to the flow diagram of FIG. 4, the object having a function for obtaining more data from the input data stream is called STREAM. To implement the STREAM object, the following functions are used: GetCurrentSize, which returns the size of the data already available; Read, which obtains the data already available; IsFinished, which returns whether more bytes will be available; and NeedMoreData, which requests more data, and may either increase the current size or add an event and return an interrupt. As an example, NeedMoreData may be called again later if the event is triggered. NeedMoreData might call other functions; for example, the body stream might request additional data from the input stream, leading to a hierarchy of (interruptible) function calls.

Returning to FIG. 4's flow diagram, the flow for process 402, AV.Infected is depicted. AV.Infected 402 may be part of antimalware program 405 tasked with scanning for malware 404 and uses NeedMoreData on the HTTP body stream to get all data needed. In the example program code corresponding to FIG. 4, an incoming connection leads to a call of routine Accept, which in turn calls a module function InputStream of module TCP. InputStream returns a stream object according to described embodiments. AV.Infected then makes a DetectProtocol function call on the stream. The DetectProtocol function of stream requires some bytes of the input stream to identify the protocol. If the bytes are not yet available, the DetectProtocol function calls NeedMoreData on the TCP.Inputstream at 412. The TCP.Inputstream may be a stream object identifying the execution stack. The stream may try to read more data from the network, and if not available, may add an event to be notified when new data is available at 414. Then, it will return with status IsInterrupted to AV.Infected 402. The DetectProtocol function will detect the interrupt, save its state in a stream object if needed, and return immediately. The thread that was executing the transaction is now free to execute other processes. If data is received, the event will trigger, and execution of the transaction will continue with the DetectProtocol function, restoration of the saved state information from the stream object, and a new call to the NeedMoreData function. Thus, instead of blocking a whole thread, the thread will exit all stack frames, freeing unneeded resources, and return later.

The same workflow may be implemented in the HTTP.RequestResponse object returned by HTTPParseRequest at 410. Calling the ParseRequest function may create a request object while minimizing data consumption. If a user wants to access the HTTP header or the body, the object may try to obtain as many bytes from the input stream as needed, calling the NeedMoreData function at 406 on its input stream until the header, or the requested part of the body response, is received at 408.

Figure 5:
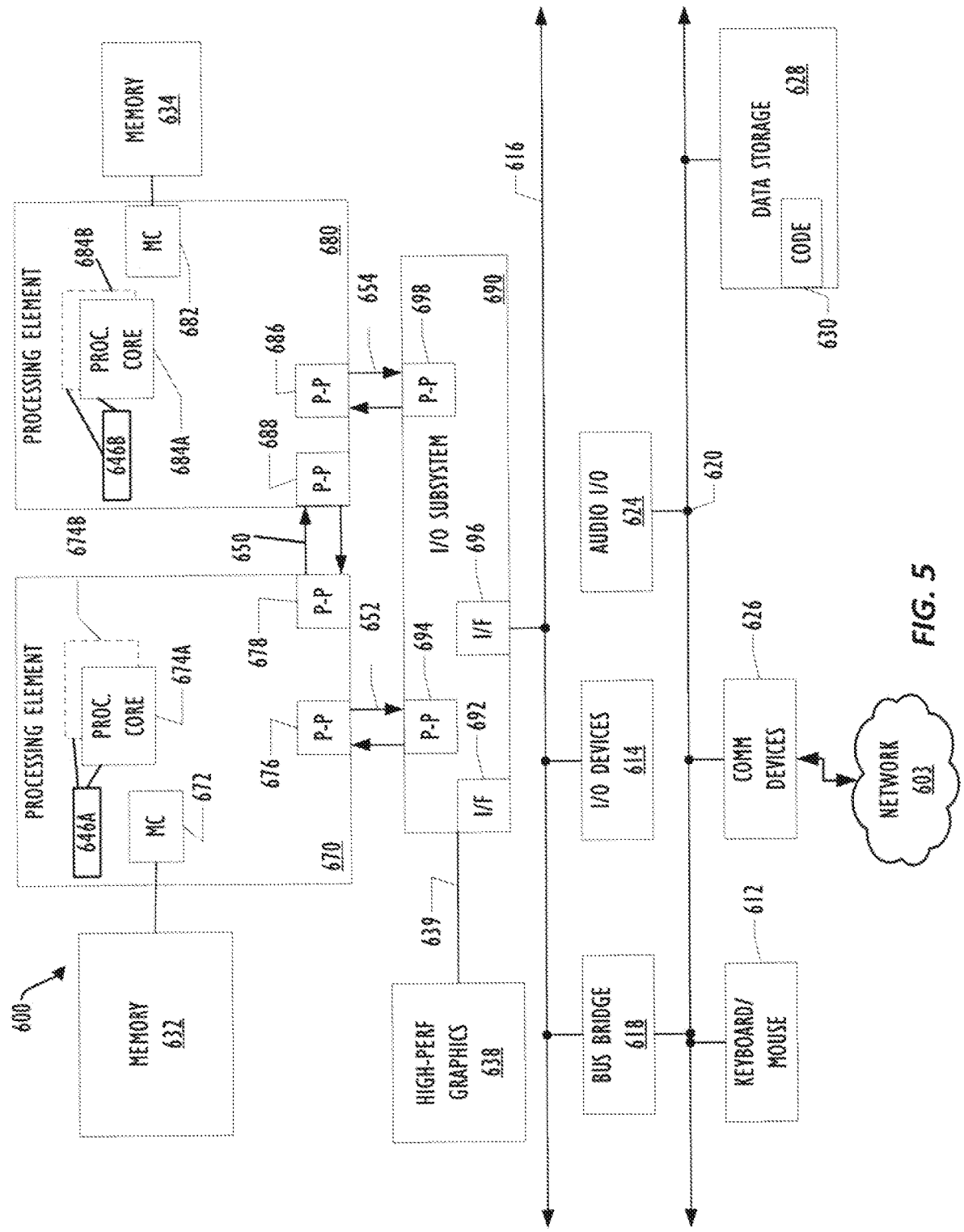
FIG. 5 is a diagram illustrating a computing device for use with techniques described herein according to one embodiment.

Referring now to FIG. 5, a block diagram illustrates a programmable device 600 that may be used within a network device, such as devices 205, in accordance with one or more embodiments. Devices 205 may not include all of the elements of FIG. 5. The programmable device 600 illustrated in FIG. 5 is a multiprocessor programmable device that includes a first processing element 670 and a second processing element 680. While two processing elements 670 and 680 are shown, an embodiment of programmable device 600 may also include only one such processing element. Programmable device 600 is illustrated as a point-to-point interconnect system, in which the first processing element 670 and second processing element 680 are coupled via a point-to-point interconnect 650. Any or all of the interconnects illustrated in FIG. 5 may be implemented as a multi-drop bus rather than point-to-point interconnects.

As illustrated in FIG. 5, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 6:
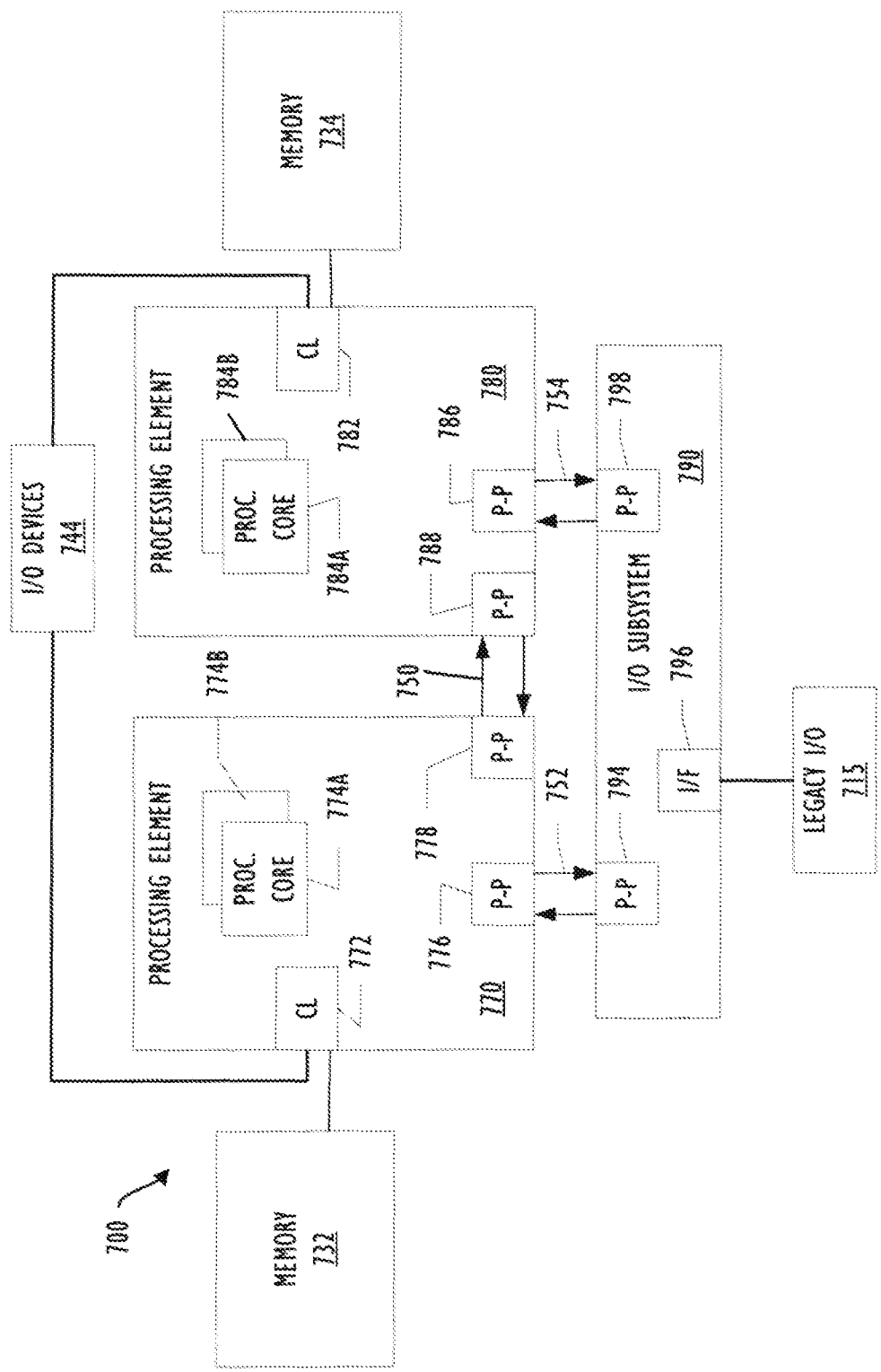
FIG. 6 is a block diagram illustrating a computing device for use with techniques described herein according to another embodiment.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670 and 680 to respective memories, namely a memory 632 and a memory 634, which may be portions of main memory locally attached to the respective processors. While MC logic 672 and 682 is illustrated as integrated into processing elements 670 and 680, in some embodiments the memory controller logic may be discrete logic outside processing elements 670 and 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770 and 780 may include integrated memory and I/O control logic ("CL") 772 and 782, respectively. In some embodiments, the 772, 782 may include memory control logic (MC) such as that described above in connection with FIG. 5. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 6, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A method for increasing scalability of asynchronous data processing, the method comprising:
  interpreting a computer program, the computer program to scan a first portion of data from a source for an input data stream for malware at a first time, the computer program to identify the input data stream as a programming language object having a function to obtain more data from the input data stream;
  in response to the scan of the first portion of the data not indicating that the malware is present, providing the first portion of the data to a first execution thread;
  in response to a request for additional data from the input data stream, determining that a second portion of the data associated with the first portion of the data from the source for the input data stream is unavailable at the first time, wherein the request for the additional data from the input data stream does not occur in response to the scan of the first portion of the data indicating that the malware is present, wherein determining that the second portion of the data is unavailable includes:
    determining a size of the first portion of the data;
    determining whether additional bytes will be available from the input data stream; and in response to the additional data being available, increasing the size of the first portion of the data;
in response to determining that the second portion of the data is unavailable:
adding an event to enable notification of the second portion of the data becoming available; and
returning an interrupt to the computer program, the interrupt to cause suspension of execution of the first execution thread;
in response to detection of the interrupt, saving state information for the first execution thread, the state information to allow an interpreter to recreate the first execution thread;
terminating execution of the first execution thread to enable resources associated with the first execution thread to be redirected to other threads of execution;
in response to receiving the second portion of the data, triggering the event;
in response to the event being triggered, determining that the second portion of the data is available from the source in the input data stream;
in response to the determination that the second portion of the data is available, scanning the second portion of the data for the malware at a second time different from the first time, a pause in the scanning occurring between the first time and the second time;
in response to the scan of the second portion of the data indicating that the malware is present, terminating processing of the first portion of the data and the second portion of the data;
in response to the scan of the second portion of the data not indicating that the malware is present, creating a second execution thread using the state information saved in connection with the first execution thread, the second execution thread different from the first execution thread; and
providing the second portion of the data to the second execution thread in response to creating the second execution thread.

2. The method of claim 1, wherein the function is a first function, and the programming language object includes a second function to obtain a size of the data available from the input data stream.

3. The method of claim 1, wherein the function is a first function, and the programming language object includes a second function to read the data available from the input data stream.

4. The method of claim 1, wherein the function is a first function, and the programming language object includes a second function to indicate whether more data will be available from the input data stream.

5. The method of claim 1, further including:
determining that the second portion of the data from the source for the input data stream is available;
obtaining the second portion of the data from the source for the input data stream; and
increasing a size of the data available from the input data stream.

6. A non-transitory machine readable medium comprising instructions that, when executed, cause a programmable device to at least:
interpret a computer program to scan a first portion of data from a source for an input data stream for malware at a first time, the computer program to identify the input data stream as a programming language object having a function to obtain more data from the input data stream;
in response to the scan of the first portion of the data not indicating that the malware is present, provide the first portion of the data to a first execution thread;
in response to a request for additional data from the input data stream, determine that a second portion of the data different from the first portion of the data from the source for the input data stream is unavailable at the first time, wherein the request for the additional data from the input data stream does not occur in response to the scan of the first portion of the data indicating that the malware is present, wherein to determine that the second portion of the data is unavailable, the instructions, when executed, cause the programmable device to:
determine a size of the first portion of the data;
determine whether additional bytes will be available from the input data stream; and
in response to the additional data being available, increase the size of the first portion of the data;
in response to determining that the second portion of the data is unavailable:
add an event to enable notification of the second portion of the data becoming available; and
return an interrupt to the computer program to cause suspension of execution of a first execution thread;
in response to detection of the interrupt, save state information for the first execution thread, the state information to allow an interpreter to recreate the first execution thread;
terminate execution of the first execution thread to enable resources associated with the first execution thread to be redirected to other threads of execution;
in response to receiving the second portion of the data, trigger the event;
in response to the event being triggered, determine that the second portion of the data is available from the source in the input data stream;
in response to the determination that the second portion of the data is available, scan the second portion of the data for the malware at a second time different from the first time, a pause in the scanning occurring between the first time and the second time;
in response to the scan of the second portion of the data indicating that the malware is present, terminate processing of the first portion of the data and the second portion of the data;
when the second portion of the data does not include the malware, create a second execution thread using the state information saved in connection with the first execution thread, the second execution thread different from the first execution thread; and
provide the second portion of the data to the second execution thread.

7. The non-transitory machine readable medium of claim 6, wherein the function is a first function, and the programming language object includes a second function to obtain a size of data available from the input data stream.

8. The non-transitory machine readable medium of claim 6, wherein the function is a first function, and the programming language object includes a second function to read the data available from the input data stream.

9. The non-transitory machine readable medium of claim 6, wherein the function is a first function, and the programming language object includes a second function to indicate whether more data will be available from the input data stream.

10. The non-transitory machine readable medium of claim 6, wherein the instructions, when executed, cause the programmable device to:
- determine that the second portion of the data from the source for the input data stream is available;
- obtain the second portion of the data from the source for the input data stream; and
- increase a size of the data available from the input data stream.

11. A system comprising:
one or more processors; and
a memory including instructions which, when executed by the one or more processors, cause the one or more processors to:
- interpret a computer program, the computer program to scan a first portion of data from a source for an input data stream for malware at a first time, the computer program to identify the input data stream as a programming language object having a function to obtain more data from the input data stream;
- in response to the scan of the first portion of the data not indicating that the malware is present, provide the first portion of the data to a first execution thread;
- interpret a request for additional data from the input data stream, wherein the request for the additional data from the input data stream does not occur in response to the scan of the first portion of the data indicating that the malware is present, wherein to interpret the request, the one or more processors are to:
  - determine a size of the first portion of the data;
  - determine whether additional bytes will be available from the input data stream; and
  - in response to the additional data being available, increase the size of the first portion of the data;
- determine that a second portion of the data from the source for the input data stream is unavailable;
- in response to determining that the second portion of the data is unavailable:
  - add an event to enable notification of the second portion of the data becoming available; and
  - return an interrupt to the computer program, the interrupt to cause suspension of execution of a first execution thread;
- in response to detection of the interrupt, save state information for the first execution thread, the state information to allow an interpreter to recreate the first execution thread;
- terminate execution of the first execution thread to enable resources associated with the first execution thread to be redirected to other threads of execution;
- in response to receiving the second portion of the data, trigger the event;
- in response to the event being triggered, determine that the second portion of the data is available from the source in the input data stream;
- in response to the determination that the second portion of the data is available, scan the second portion of the data for the malware at a second time different from the first time, a pause in the scanning occurring between the first time and the second time;
- in response to the scan of the second portion of the data indicating that the malware is present, terminate processing of the first portion of the data and the second portion of the data;
- in response to the scan of the second portion of the data not indicating that the malware is present, create a second execution thread using the state information saved in connection with the first execution thread, the second execution thread different from the first execution thread; and
- provide the second portion of the data to the second execution thread.

12. The system of claim 11, wherein the function is a first function, and the programming language object includes a second function to obtain a size of data available from the input data stream.

13. The system of claim 11, wherein the function is a first function, and the programming language object includes a second function to read the data available from the input data stream.

14. The system of claim 11, wherein the function is a first function, and the programming language object includes a second function to indicate whether more data will be available from the input data stream.

15. The system of claim 11, wherein the one or more processors are to:
- determine that the second portion of the data from the source for the input data stream is available;
- obtain the second portion of the data from the source for the input data stream; and
- increase a size of the data available from the input data stream.

* * * * *